United States Patent
Yang et al.

(10) Patent No.: US 6,262,549 B1
(45) Date of Patent: Jul. 17, 2001

(54) FAN SPEED PULSE FILTER FOR A PWM FAN

(75) Inventors: Ta-yung Yang, Taoyuan; Jenn-yu G. Lin; Cheng-chi Hsueh, both of Taipei, all of (TW)

(73) Assignee: System General Corp., Milpitas, CA (US)

( * ) Notice: Subject to any disclaimer, the term of this patent is extended or adjusted under 35 U.S.C. 154(b) by 0 days.

(21) Appl. No.: 09/607,024

(22) Filed: Jun. 29, 2000

(51) Int. Cl.⁷ ........................................ G01P 3/489
(52) U.S. Cl. ..................... 318/463; 318/464; 388/912; 324/166
(58) Field of Search ..................... 318/461, 463, 318/640, 464; 388/909, 912; 324/160, 163, 166

(56) References Cited

U.S. PATENT DOCUMENTS

| 4,110,676 | * | 8/1978 | Edick et al. ............................ 322/31 |
| 4,138,728 | * | 2/1979 | Tung ................................. 324/160 X |
| 5,727,928 | | 3/1998 | Brown ..................................... 361/23 |
| 5,883,510 | * | 12/1999 | Torre et al. ............................ 324/160 |
| 6,008,603 | * | 12/1999 | Jones et al. ............................ 318/254 |
| 6,135,718 | * | 10/2000 | Yang ....................................... 417/22 |

\* cited by examiner

*Primary Examiner*—Bentsu Ro
(74) *Attorney, Agent, or Firm*—Jiawei Huang; J. C. Patents

(57) ABSTRACT

A fan speed pulse filter is used for a PWM fan. The filter comprises a comparator, a latch circuit and a synchronizer. The fan unit, including a tachometer pulse output, is controlled by a PWM signal for determining the fan speed. By comparing the PWM signal with a reference voltage, the comparator generates a reset signal. The latch circuit, coupled to the comparator and the fan unit, receives the reset signal and the tachometer pulse and outputs a filtered tachometer pulse containing no phantom pulses. Furthermore, a synchronizer generates an output signal without interruption when the PWM signal is switched off.

4 Claims, 9 Drawing Sheets

FAN SPEED PULSE FILTER FOR A PWM FAN

BACKGROUND OF THE INVENTION

1. Field of Invention

The present invention relates to cooling fans. More particularly, the present invention relates to a fan speed pulse filter for a pulse width modulation (PWM) fan.

2. Description of Related Art

Fan cooling is typically used to cool electric system, such as microprocessors and power suppliers, when the power consumption of the system exceeds its natural cooling capacities. However, fan failure can result in overheating, and may cause permanent damage to the system. Therefore, it is desirable to be able to detect a slow fan speed or fan failure and initiate an automatic shutdown to avoid thermal runaway. By equipping a Hall-effect switch or by sensing a fan motor current, many fan systems or fans include a tachometer output, which outputs pulses per revolution of the fan. The tachometer output of the fan is connected to a CPU or input-output (I/O) ports for a fan speed monitor and control.

FIG. 1 illustrates the tachometer output pulses when the fan is operating at full speed. In general, the speed of the fan is measured in revolution per minute (RPM); speed is determined by measuring the period (Tp) of the tachometer pulses. The RPM is defined by $RPM=60/(Np*Tp)$, wherein Np is the pole number of the fan.

Many fan controllers use PWM control, with fan speed determined by the duty cycle of the PWM signal. The PWM mode provides highly efficient fan control and prevents the fan from locking during a start-up period. However, generating the tachometer pulses has the following difficulties.

The tachometer only operates when power is applied to the fan. FIG. 2 shows the output pulses of the tachometer. As shown in FIG. 2, Tp1 is the period of the tachometer pulse, and an incorrect pulse period Tp2 is produced when the PWM signal is off, causing an inaccurate RPM for the fan. However, the tachometer only operates correctly when proper power is applied. When the applied power is incorrect, an inaccurate RPM is output; as a result, the fan is driven by a slow slew of the PWM signal. Namely, noise pulses 20 occur at the rising time Tr or the falling time Tf of the PWM signal, as shown in FIG. 3.

In addition, the tachometer may output phantom pulses when the power is rapidly applied to the fan. FIG. 5 shows the phantom pulses 32 of the tachometer pulse, in which the fan is driven by a fast slew PWM signal.

Noise, the phantom pulse, or an incorrect period of the tachometer pulse introduces an incorrect RPM for the fan. It is necessary to provide a fan speed pulse filter to filter the noise and the phantom pulses and generate a non-interrupted pulse output.

SUMMARY OF THE INVENTION

The invention provides a fan speed pulse filter for a PWM fan. The filter comprises a comparator and a latch circuit. The PWM switch connects to the power source to generate a PWM signal. The fan unit, including a tachometer pulse (tacho-pulse) output, is controlled by the PWM signal to determine the fan speed. The comparator receives the PWM signal, wherein the comparator generates a reset signal by comparing the PWM signal with a reference voltage. The latch circuit, coupled to the comparator and the fan unit, is used to receive the reset signal and the tacho-pulse and to output a pole signal (filtered tacho-pulse containing no phantom pulses).

In addition, fan speed pulse filter for a PWM fan further comprises a synchronizer, an up-counter, a Q-buffer, a down-counter and an oscillator. The synchronizer is coupled to the output of the latch circuit to generate an output signal without interrupt when the PWM signal is off. The up-counter couples to the synchronizer. The Q-buffer is coupled to the up-counter and the synchronizer. The down-counter is coupled to the buffer and the synchronizer. Further, the oscillator is coupled to the synchronizer for providing system clock signals to the synchronizer, the up-counter, the buffer and the down counter.

The up-counter, the Q-buffer, the down-counter and the oscillator mentioned above can be integrated into the synchronizer as a whole.

Advantageously, the fan speed pulse filter for a PWM fan comprises two major parts: one is used for eliminating phantom pulses, and the other is used for outputting a continuous pulse output.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

The fan speed pulse filter for a PWM fan comprises two major parts: one is used for eliminating phantom pulses, and the other is used for outputting a continuous pulse output.

Figure 1:
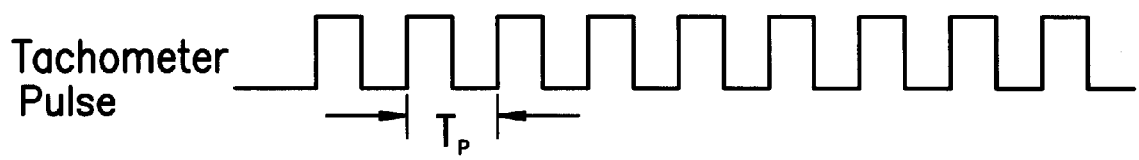
FIG. 1 illustrates the tachometer output pulses during the full speed of the fan.
Figure 2:
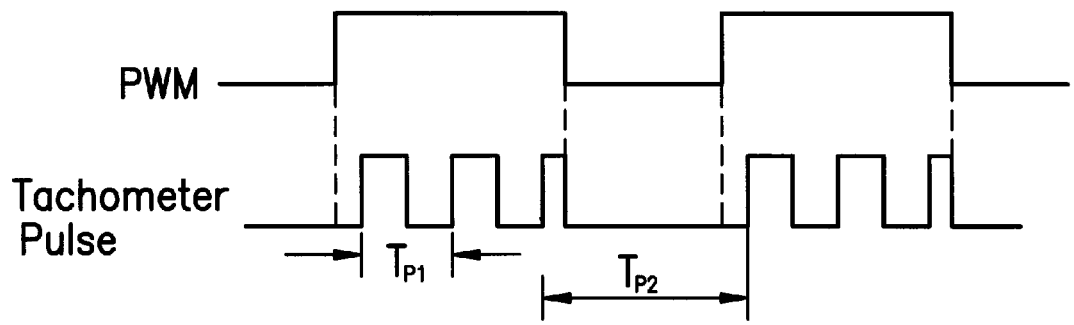
FIG. 2 shows the output pulses of the tachometer according to the conventional method.
Figure 3:
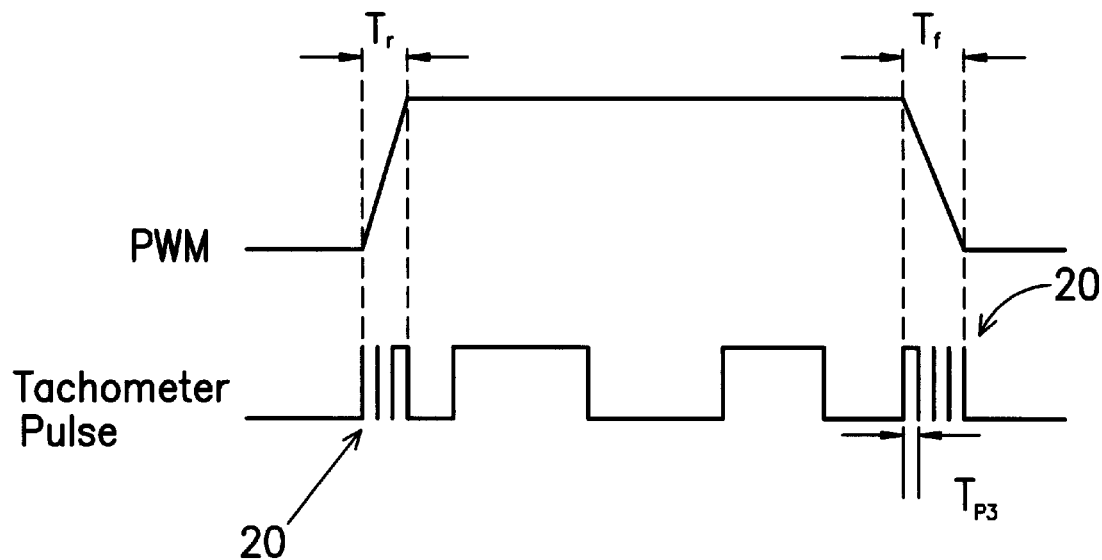
FIG. 3 shows the fan when driven by a slow slew of the PWM signal and noise pulses occur.
Figure 4:
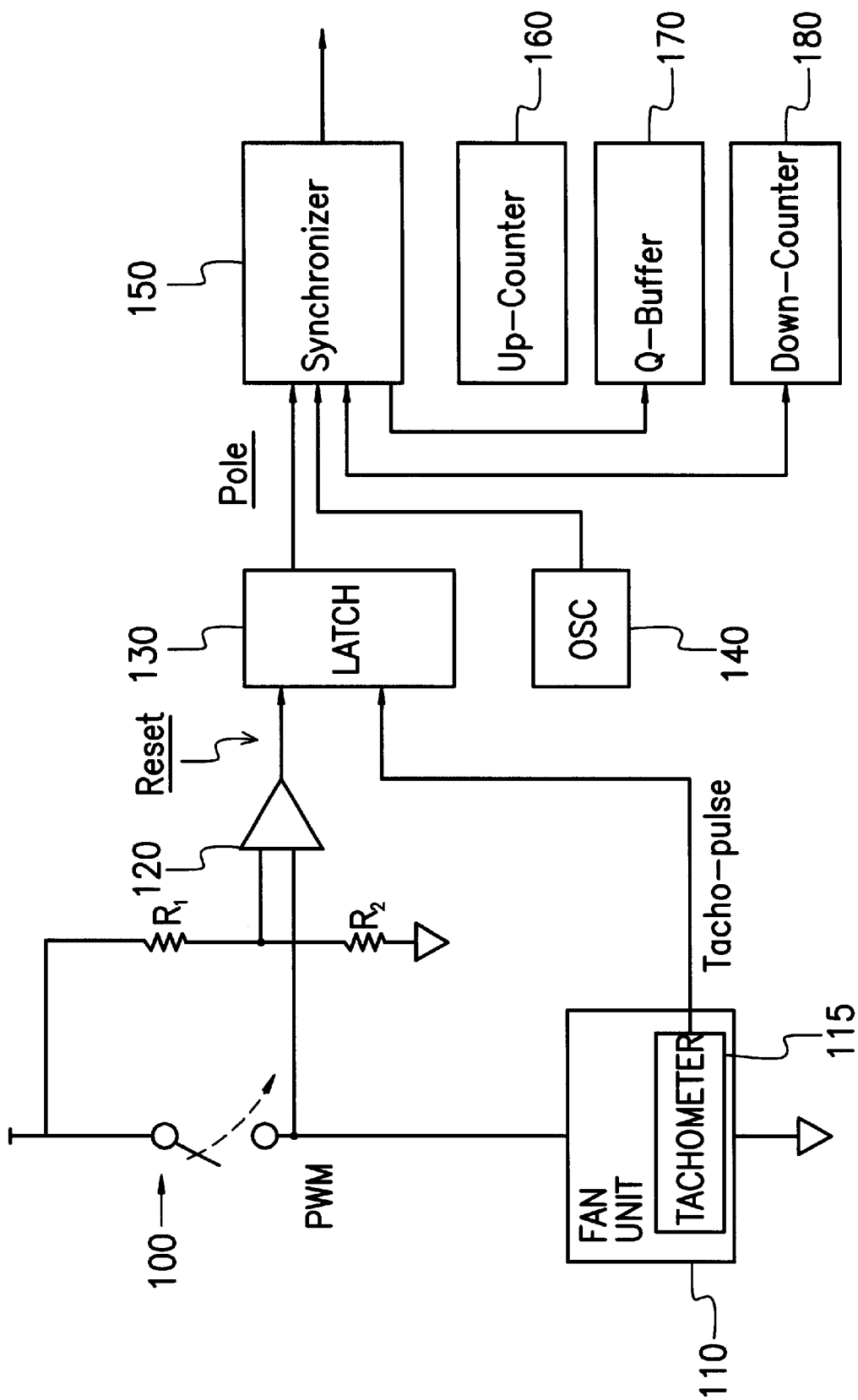
FIG. 4 schematically shows a block diagram of the fan speed pulse filter for a PWM fan according to one embodiment of the present invention.
Figure 5:
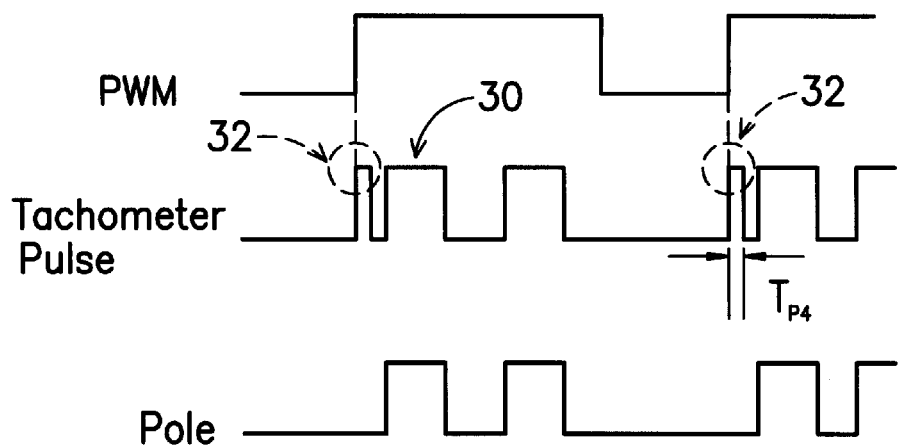
FIG. 5 shows a waveform diagram of the PWM signal, a tachometer pulse containing phantom pulse and a pole signal (filtered tachometer pulse containing no phantom pulses)

FIG. 4 schematically shows a block diagram of the fan speed pulse filter for a PWM fan according to one embodiment of the present invention. The fan speed pulse filter for a PWM fan comprises a voltage divider consisting of resistors R1 and R2, a comparator 120, a latch circuit 130, an oscillator 140, a synchronizer 150, an up-counter 160, a Q-buffer 170 and a down-counter 180. A PWM switch 100 is controlled to generate a PWM signal for driving a fan unit 110. The duty cycle of the PWM signal determines the fan speed of the fan unit 110. The voltage divider can provide a reference voltage to the comparator 120 for filtering voltage less than 80% of the specification.

Figure 6:
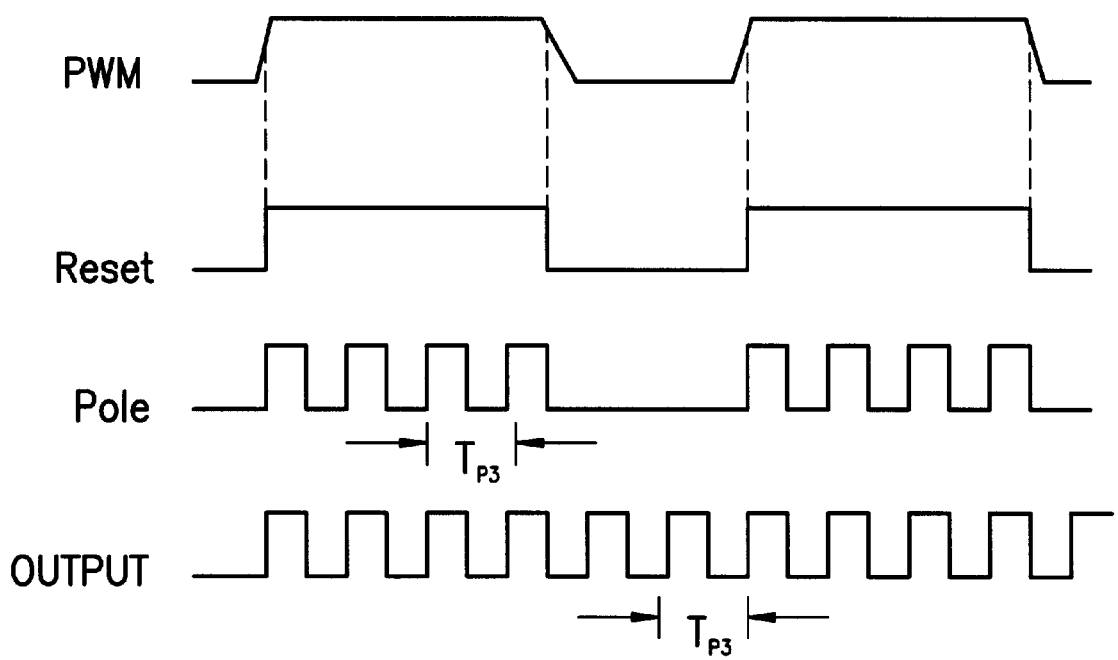
FIG. 6 schematically shows a waveform diagram of the PWM signal, a reset signal, the pole signal and an output signal according to the present invention.

The comparator 120 receives the PWM signal and the reference voltage to generate a reset signal. The fan unit 110 further comprises a tachometer 115 for generating a tacho-pulse. The latch circuit 130 then receives the reset signal and the tacho-pulse for generating a pole signal without containing any phantom pulse. As shown in FIG. 6, due to the reset signal, the outputted pole signal contains no phantom pulse.

However, the generated pole signal is not continuous because the switching of the PWM signal. As shown is FIG. 6, the pulses of the pole signal only occur when the PWM signal is on. No pole signal is output when the PWM signal is switched off. Namely, the pole signal is non-continuous.

According to the present invention, in order to generate a continuous pole signal, the oscillator 140, the synchronizer 150, the up-counter 160, the Q-buffer 170 and the down-counter1 80 are used to generate the output pulse, having the same period Tp3 as shown in FIG. 6, when the PWM signal is off.

Detailed description of the latch circuit 130, the synchronizer 150, the up-counter 160, the Q-buffer 160 and the down-counter 180 and their function are discussed as follows.

Figure 7:
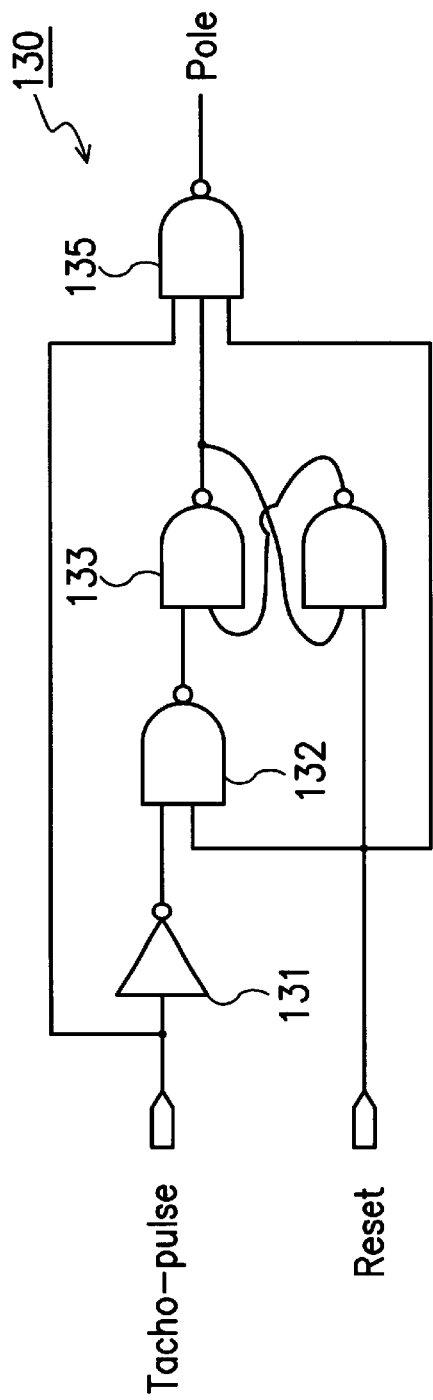
FIG. 7 shows an exemplary circuit of the latch circuit shown in FIG. 4.

FIG. 7 shows an exemplary circuit of the latch circuit 130 shown in FIG. 4. The latch circuit shown in FIG. 7 comprises an inverter 131, NAND gates 132, 133, 134 and an AND gate 135. As shown in FIG. 7, the tacho-pulse is input into the inverter 131 and the AND gate 135, and the reset signal from the comparator 120 is input into the NAND gates 132, 134 and the AND gate 135. The NAND gates 133 and 134 form a latch. The output of the latch is connected to the AND gate 135. Finally, the AND gate 135 outputs the pole signal. When the reset signal is transient from low to high, the output of the latch circuit 130 is latched at a low level until the tacho-pulse is transient from low to high. Then, the pole signal and the output of the latch circuit 130 vary in response to the tacho-pulse, whereby the phantom pulses are eliminated.

Figure 8:
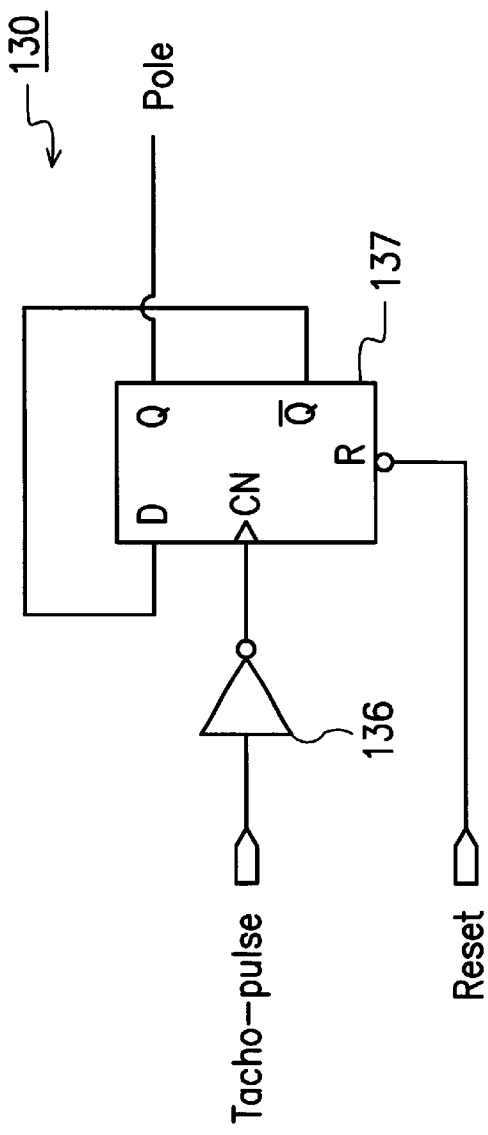
FIG. 8 shows another exemplary circuit of the latch circuit shown in FIG. 4.

FIG. 8 shows another exemplary circuit of the latch circuit shown in FIG. 4. The latch circuit consists of an inverter 136 and a flip-flop 137. As show in FIG. 8, the inverter 136 is used for receiving the tacho-pulse, and the reset signal is input into the reset terminal of the flip-flop 137. The flip-flop 137, for example, is a D-type flip-flop that is a master-slave flip-flop of falling-edge enabled.

Figure 9:
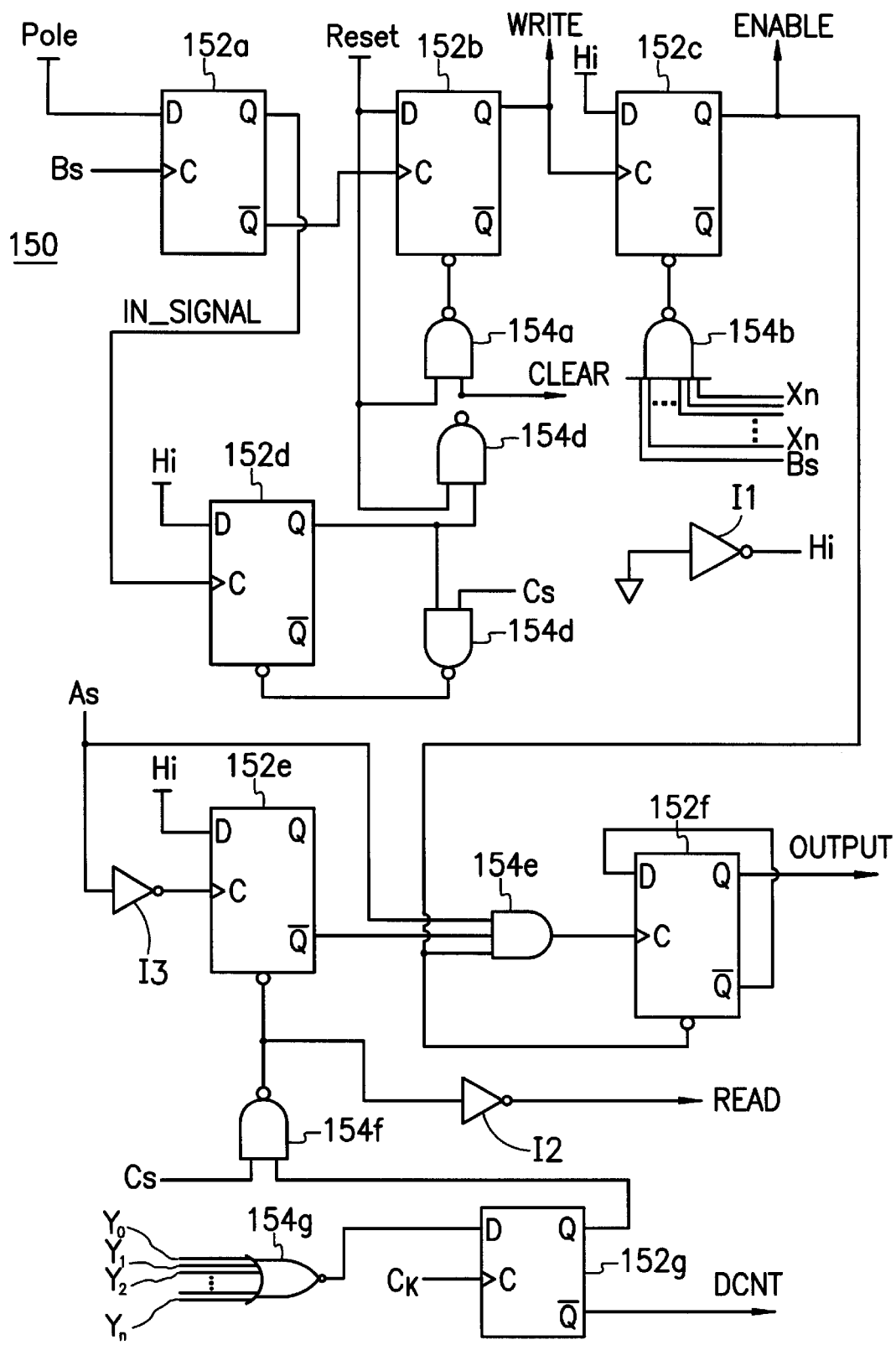
FIG. 9 shows an exemplary circuit of the synchronizer shown in FIG. 4.
Figure 13:
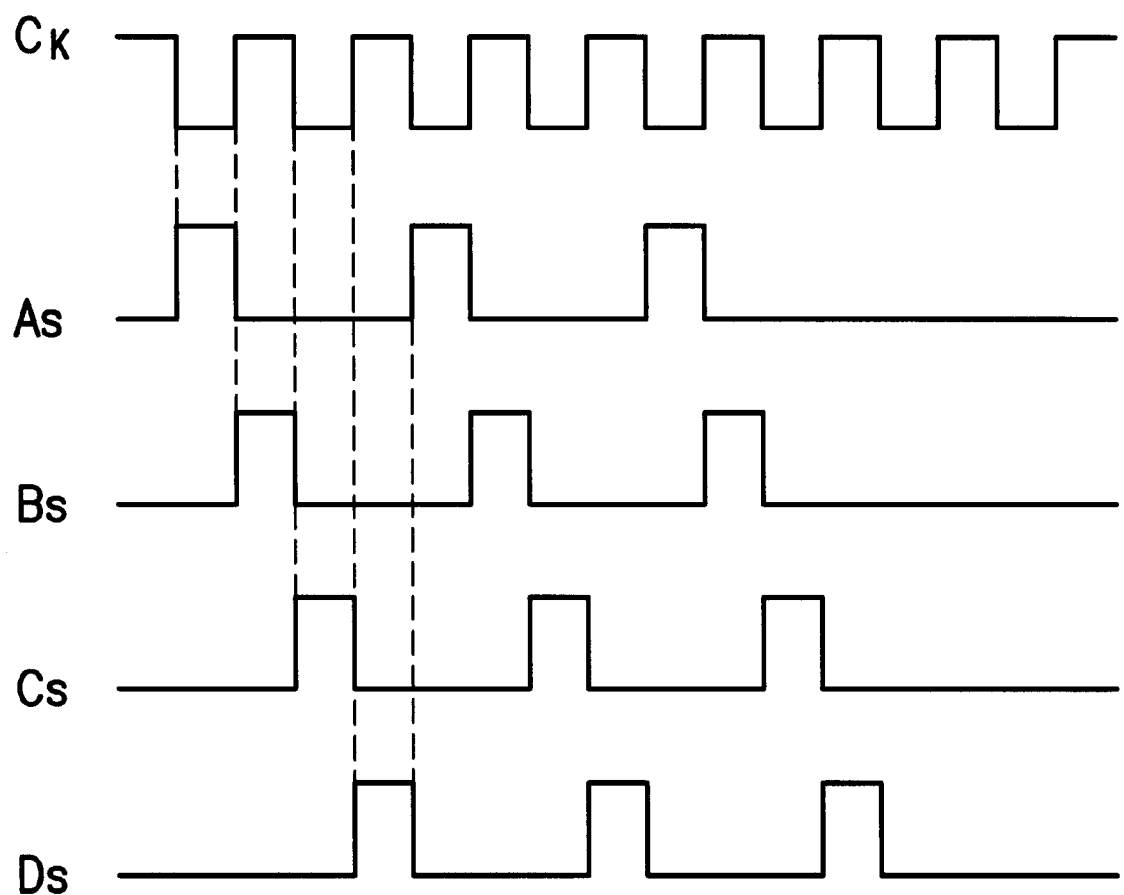
FIG. 13 shows a timing diagram of clock signals Ck, As, Bs, Cs, and Ds.

FIG. 9 shows an exemplary circuit of the synchronizer shown in FIG. 4. The oscillator 140 generates the clock signals of Ck, As, Bs, Cs, and Ds. As shown in FIG. 13, the clock Ck is the system clock. The periods of the clock As, Bs, Cs and Ds are 2 times the period of the clock Ck. Each of the clock As, Bs, Cs and Ds are shifted by half period of the clock Ck.

The synchronizer 150 comprises flip-flops 152a, 152b, 152c, 152d, 152e, 152f and 152g, logic gates 154a, 154b, 154c, 154d, 154e, 154f and 154g. The pole signal from the latch circuit 130 is inputted to the flip-flop 152a for generating an IN_SIGNAL which is synchronized with the clock Bs and further inputted to the flipflops 152b and 152d. The gate 154c then generates a CLEAR signal in response to the IN_SIGNAL to clear the up counter 160, by which the up-counter 160 can count upwards from zero. The gate 154b receives the counting bits X0, X1, . . . , Xn from the up-counter 160. The flip-flop 152c can output an ENABLE signal to a reset terminal of the flip-flop 152f in response to the outputs of the gate 154b and the flip-flop 152b. Then, the flip-flop 152f outputs an OUTPUT pulse in response to the output of the gate 154e and the ENABLE signal.

If the value counted by the up-counter 160 is over-flow before the CLEAR signal is asserted, which means that all counting bits are "1" within a time interval of Tx (see FIG. 14), the output ENABLE signal of the flip-flop 152c becomes low, whereby the output of the flip-flop 152f becomes low. Namely, no pulses are output.

Figure 14:
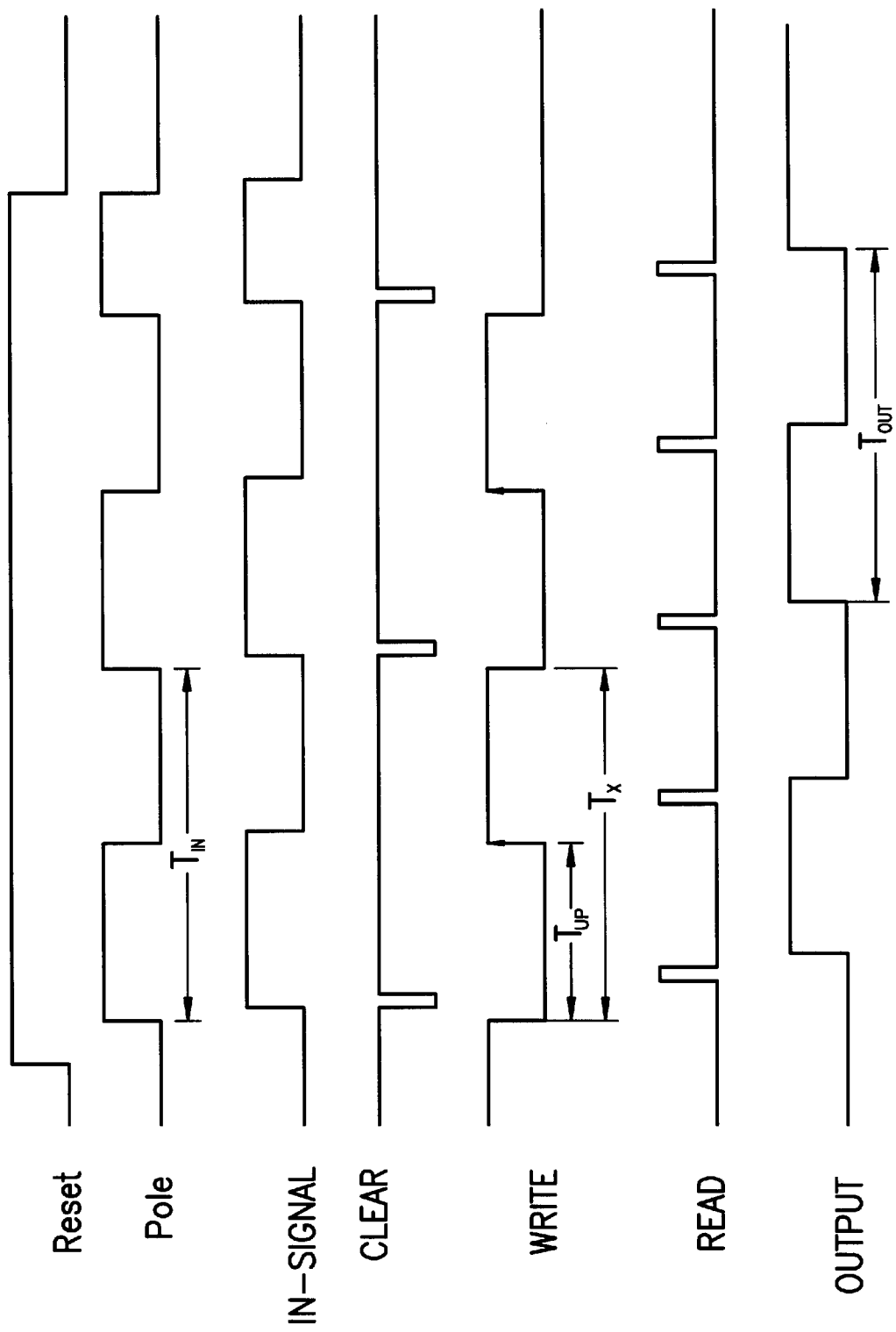
FIG. 14 shows a timing chart of the internal signals of the synchronizer.

In addition, the output of the flip-flop 152b generates a WRITE signal in response to the falling edge of the IN_SIGNAL, which is shown in FIG. 14. As shown in FIG. 14, the counted value by the up-counter 160 within a time interval Tup is written into the Q-buffer 170 in response to the rising edge of the WRITE signal.

The output of the flip-flop 152g becomes high when the down-counter 180 counts downwards to zero, and then the inverter 12 outputs the READ signal according to a system clock Cs. Therefore, the values $Q_0, Q_1, \ldots, Q_n$ generated by the Q-buffer are read by the down-counter 180 and the down-counter 180 can count down starting at the received $Q_0, Q_1, \ldots, Q_n$. The complementary output of the flip-flop 152g generates a DCNT signal for enabling the down-counter 180.

When the down-counter 180 counts to zero, which means that $Y_0, Y_1, \ldots, Y_n$ are all zero, the flip-flop 152e generates a pulse to the AND gate 154e in response to the clock As and the output of the gate 154f. By ANDing the clock As with the ENABLE signal, the flip-flop 152f outputs the OUTPUT signal. The period Tout of the OUTPUT signal is equal to the period Tin of the pole signal, and the OUTPUT signal is continuous if the counting value of the up-counter is not over-flow, which means the ENABLE is in a high state. Namely, the output fan speed pulse signal is not interrupted due to the switching of the PWM signal.

Figure 10:
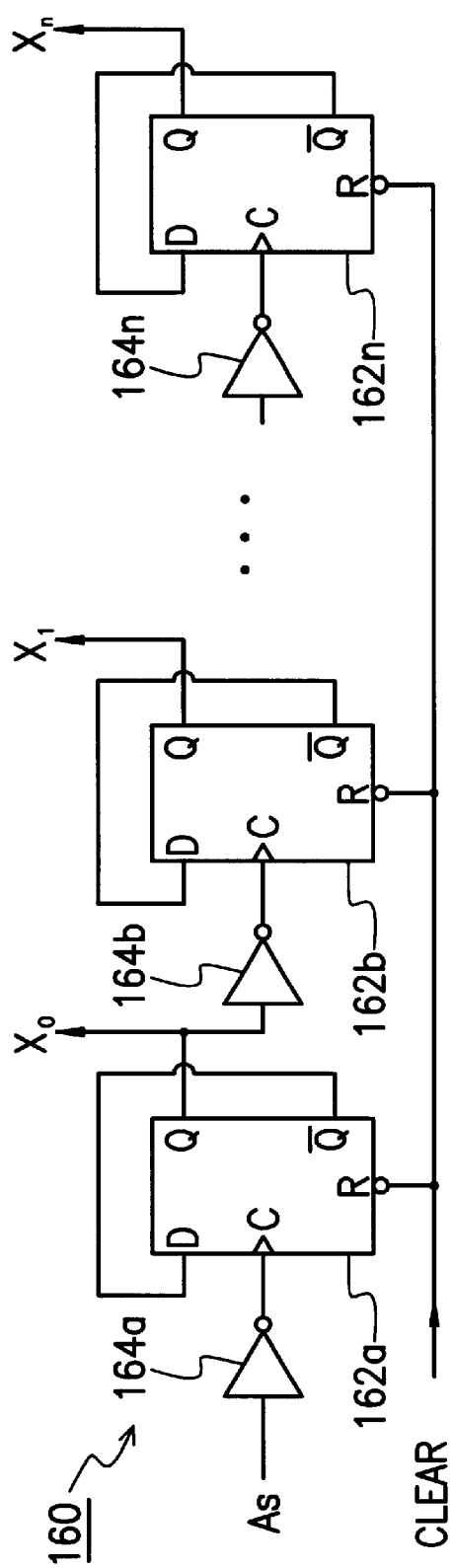
FIG. 10 shows an exemplary circuit of the up-counter shown in FIG. 4.
Figure 11:
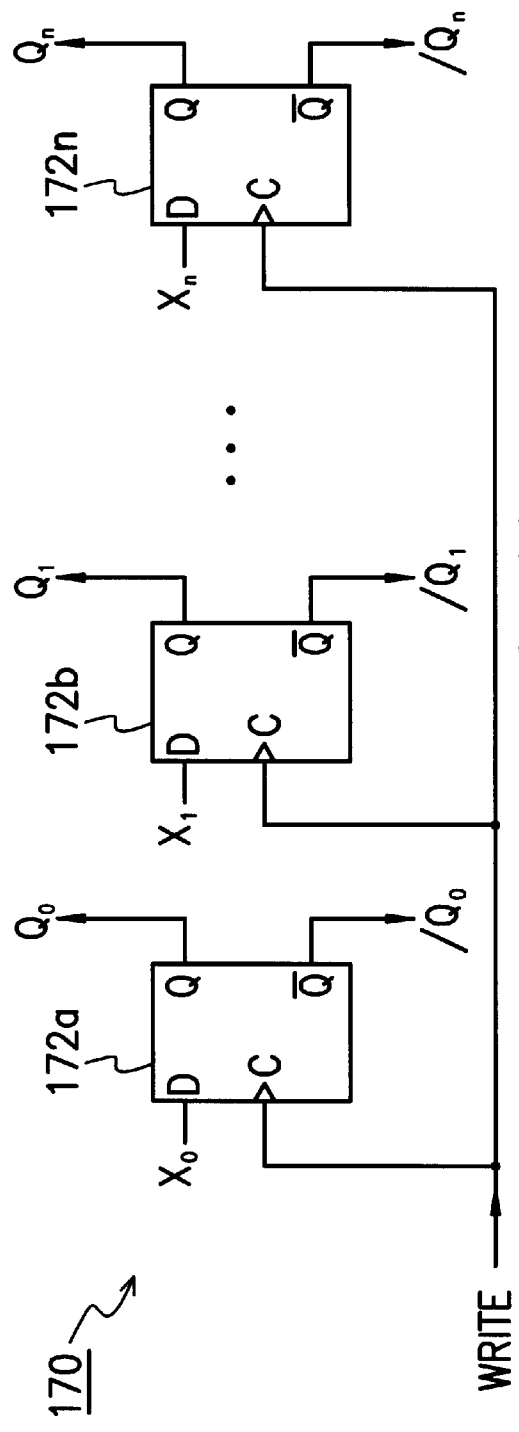
FIG. 11 shows an exemplary circuit of the Q-buffer shown in FIG. 4.

FIG. 10 shows an exemplary circuit of the up-counter 160 shown in FIG. 4. The up-counter 160 includes n+1 flip-flops 162a, 162b, . . . , 162n and n+1 inverters 164a, 164b, . . . , 164n. The CLEAR signal is inputted to each reset terminal of the flip-flops 162a, 162b, . . . , 162n. Each of the complementary output of the flip-flop is connected to its own input terminal D. The output Q of each flip-flop connects to the clock terminal of next flip-flop, and serves as a counting bit, such as $X_0, X_1, \ldots, X_n$. The first inverter 164a is used for receiving the clock As. FIG. 11 shows an exemplary circuit of the Q-buffer 170 shown in FIG. 4. The Q-buffer 170 includes flip-flops 172a, 172b, . . . , 172n, which number is the same as that of the up-counter 160. Each input D receives a counting bit, such as $X_0$, to output a value $Q_0$ in response to the WRITE signal. The above mentioned circuit structures of the up-counter 160 and the Q-buffer 170 are only an exemplary circuit and do not limit the scope of the present invention.

Figure 12:
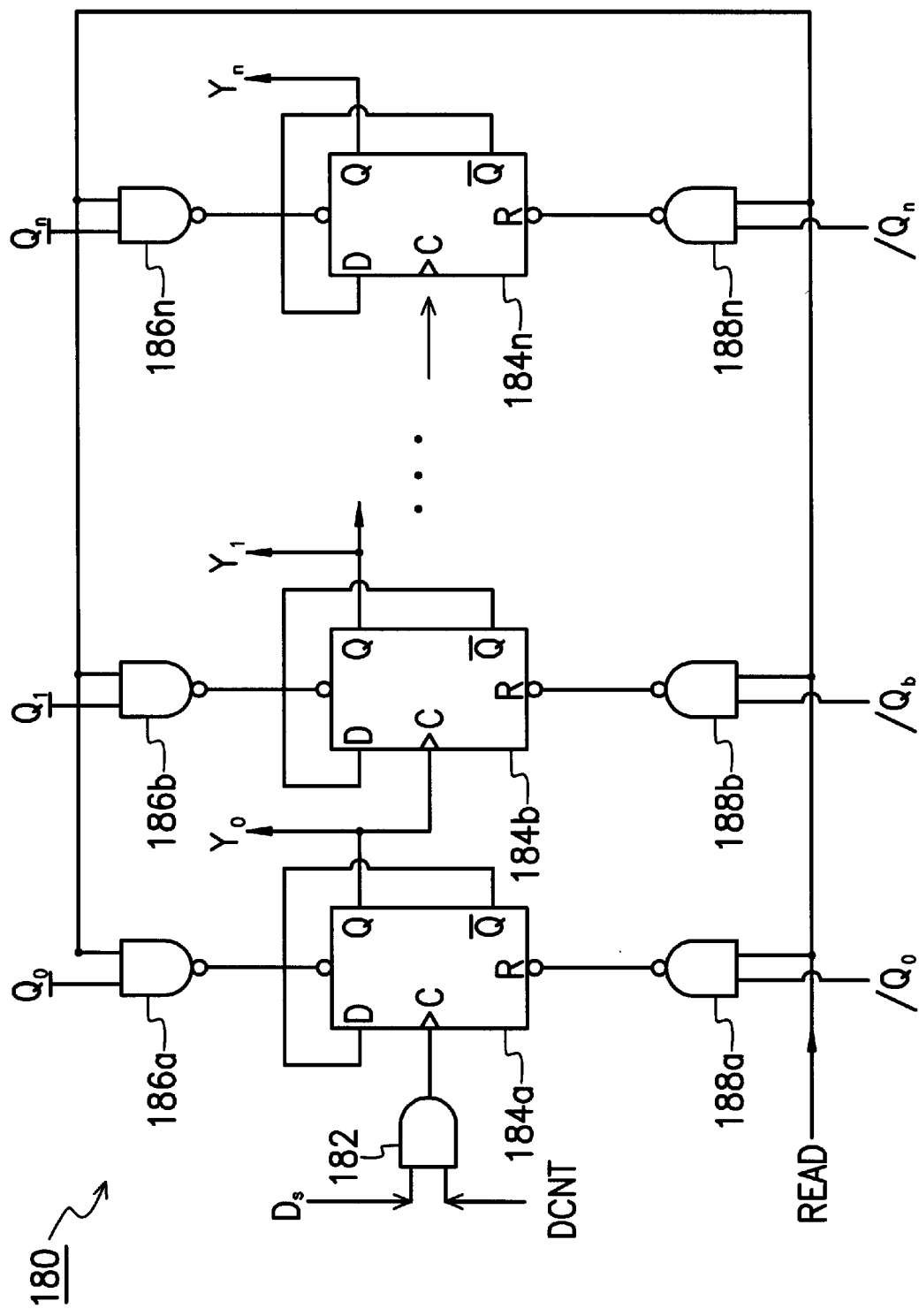
FIG. 12 shows an exemplary circuit of the down-counter shown in FIG. 4.

FIG. 12 shows an exemplary circuit of the down-counter 180 shown in FIG. 4. The down-counter 180 also includes n+1 flip-flops 184a, 184b, . . . , 184n, the preset terminal and reset terminal of each flip-flop, such as 184a, receives $Q_0$ and $\overline{Q_0}$ through gate 186a and gate 188a respectively. A gate 152 ANDs the clock Ds and the DCNT signal and then outputs to the clock terminal of the flip-flop 184a. The READ signal is input into all of the gates 186a, ..., 186n, and 188a, ..., 188n for parallel loading the value of the Q-buffer to the down-counter 180. The down-counter counts down starting at the received $Q_0, Q_1, \ldots, Q_n$.

As described above, the fan speed pulse filter for a PWM fan of the present invention can eliminate the phantom pulses at the rising or falling edge of the PWM signal. Furthermore, the fan speed pulse filter for a PWM fan also outputs a continuous pulse output, which is not interrupted when the PWM signal is off.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fan speed pulse filter for a PWM fan, comprising:

a comparator for receiving a PWM signal, wherein the comparator generates a reset signal by comparing the PWM signal with a reference voltage; and a latch circuit coupled to the comparator and a fan unit, for receiving the reset signal and a tacho-pulse signal generated by the fan unit and outputting a pole signal containing no phantom pulses, wherein when the reset signal is transient from low to high, the pole signal is latched at a low level until the tacho-pulse signal is transient from low to high, and then the pole signal varies in response to the tacho-pulse signal.

2. The fan speed pulse filter for a PWM fan of claim 1, further comprising:

a synchronizer coupled to the latch circuit for generating an output signal without interruption when the PWM signal is off;

an up-counter coupled to the synchronizer;

a Q-buffer coupled to the up-counter and the synchronizer;

a down-counter coupled to the Q-buffer and the synchronizer; and an oscillator coupled to the synchronizer for providing system clock signals to the synchronizer, the up-counter, the Q-buffer and the down-counter.

3. The fan speed pulse filter for a PWM fan of claim 1, wherein the reference voltage is generated by a voltage divider consisting of a first resistor and a second resistor.

4. A fan speed pulse filter for a PWM fan, comprising:

a comparator for receiving a PWM signal, wherein the comparator generates a reset signal by comparing the PWM signal with a reference voltage;

a latch circuit coupling to the comparator and a fan unit, for receiving the reset signal and a tacho-pulse signal generated by the fan unit and outputting a pole signal containing no phantom pulses, wherein when the reset signal is transient from low to high, the pole signal is latched at a low level until the tacho-pulse signal is transient from low to high, and then the pole signal varies in response to the tacho-pulse signal; and a synchronizer coupled to the latch circuit for generating an output signal without interruption when the PWM signal is off.

* * * * *